United States Patent [19]

Mitschker et al.

[11] Patent Number: 4,943,420

[45] Date of Patent: Jul. 24, 1990

[54] PROCESS FOR RECOVERING GALLIUM

[75] Inventors: Alfred Mitschker, Odenthal-Holz; Peter M. Lange, Leverkusen; Heiko Hoffmann, Bergisch Gladbach; Günter Lossmann, Bonnl, all of Fed. Rep. of Germany; Andries P. van der Meer, Arnhem; Cornelius J. Smit, Am Zevenaar, both of Netherlands

[73] Assignees: Bayer Aktiengesellschaft, Leverkusen; Ingal International Gallium GmbH, Schwandorf, both of Fed. Rep. of Germany

[21] Appl. No.: 337,585

[22] Filed: Apr. 13, 1989

[30] Foreign Application Priority Data

May 3, 1988 [DE] Fed. Rep. of Germany ....... 3814916

[51] Int. Cl.$^5$ .............................................. C01G 15/00
[52] U.S. Cl. .......................... 423/112; 423/DIG. 14
[58] Field of Search ..................... 423/112, DIG. 14; 75/101 BE

[56] References Cited

U.S. PATENT DOCUMENTS 4,631,177 12/1986 Yotsuyanagi ...................... 423/112

*Primary Examiner*—Robert L. Stoll
*Assistant Examiner*—Steven J. Bos
*Attorney, Agent, or Firm*—Sprung Horn Kramer & Woods

[57] ABSTRACT

In the process for recovering gallium from aqueous, alkaline solutions by adsorption of the gallium on to bead-polymerized synthetic resins impregnated with 8-hydroxyquinolines and elution thereof with aqueous acids, the synthetic resins employed according to the invention are macroporous polydivinylbenzene or macroporous divinylbenzene copolymers which have been obtained by bead polymerization of divinylbenzene or mixtures of aromatic mono-, di- and/or trivinylbenzenes containing at least 50% by weight of divinylbenzene, in the presence of methyl isobutyl ketone, and which have been loaded with 160–190 g of Kelex 100 per liter of resin; in addition the resin is washed with sodium hydroxide solution after the elution step and before the commencement of each individual service cycle.

7 Claims, No Drawings

PROCESS FOR RECOVERING GALLIUM

The invention relates to a new, improved process for recovering gallium from aqueous solutions by the adsorption thereof on to synthetic resins impregnated with Kelex 100 ((active compound: 7-(4-ethyl-1-methyloctyl)-8-hydroxyquinoline)).

U.S. Pat. No. 4,631,177 and European Application Nos. 234,319, 258,146 and 265,356 disclose the selective recovery of gallium from aqueous alkaline solutions by filtering the gallium-containing solutions through bead-polymerised synthetic resins which are arranged in a filter tube (column) and have been impregnated with Kelex 100, and then eluting the gallium from the resins by treating the resins loaded with gallium with aqueous acids.

According to the information contained in EP-A Nos. 258,146 and 265,356 the processes described in U.S. Pat. No. 4,631,177 and EP-A No. 234,319 are not suitable for use on an industrial scale since resins impregnated with Kelex 100 are employed therein which contain only 0.1 to 0.6 g of Kelex per g of resin and thus have too low a capacity for practical use. To improve the processes described in U.S. Pat. No. 4,631,177 and EP-A No. 234,319 it is therefore proposed in EP-A Nos. 258,146 and 265,356 to load the carrier resins with considerably larger quantities of Kelex, namely 250 to 350 g of Kelex per liter of (dry) resin, and-according to EP-A No. 265,356—to use a resin which is particularly suitable for taking up such high quantities of Kelex. These adsorbents loaded with 250 to 350 g of Kelex per liter of resin do however have the disadvantage that they only display inadequate selectivity; they adsorb too great a quantity of aluminium compared with gallium. The increase in the consumption of acid for elution resulting from the decrease in selectivity and the expense associated with the working-up of the aluminium-containing elution solutions greatly reduce the economic efficiency of the process.

The processes previously described also have the disadvantage that, even when they are carried out on a merely semitechnical scale, the pressure in the adsorption column already increases to a far too great extent after only a small number of cycles when gallium-containing aluminate solutions of the kind obtained in the production of aluminium oxide by the Bayer process, i.e. aluminate solutions with a relatively high content of organic compounds, are employed, and the capacity of the resin to adsorb gallium decreases to such an extent that the process has to be stopped and, since back-washing of the resin bed only produces an insignificant reduction in pressure and no improvement in the adsorptive capacity of the resin, the resin has to be removed from the column.

It has now been found that a process for the recovery of gallium from aqueous alkaline solutions, in particular aluminate solutions formed in the Bayer process, which can be carried out economically on an industrial scale, is obtained by using a special type of macroporous bead polymer as the carrier material, loading the latter with only a specific limited quantity of Kelex, namely 160 to 190 g of Kelex 100 per liter of (dry) resin and not immediately beginning with the loading step after the elution of the gallium from the resin, but first of all expelling the acid from the resin bed by washing the resin with water, then washing the resin with aqueous sodium hydroxide solution and only then beginning the service cycle once again with the loading step.

It has been found that the special carrier resins display maximum selectivity when loaded with only 160 to 190 g of Kelex 100 per liter of resin and that, despite being loaded with considerably smaller quantities of Kelex than those recommended according to the prior art, they nevertheless possess a capacity for gallium which is completely satisfactory for the use of the process on an industrial scale.

The introduction of the resin wash with sodium hydroxide solution after the elution step has the surprising result that no increase in pressure takes place in the column even after more than 150 service cycles and that the capacity of the resins to adsorb gallium remains virtually unchanged.

In the processes described in EP-A Nos. 234,319, 258,146 and 265,356 and in U.S. Pat. No. 4,631,177 the resins which have been eluted and washed with water are not washed with sodium hydroxide solution before being reloaded with the aluminate solution. In example 1 of U.S. Pat. No. 4,631,177 the unused resin is conditioned by a treatment with sodium hydroxide solution before the adsorption/elution step, which is carried out ten times, is begun; this conditioning does however have nothing in common with the washing according to the invention of the resin which has been eluted and washed with water since it is carried out only once, namely before the commencement of the service cycles and not, as in the case of the wash with sodium hydroxide solution according to the invention, regularly after each elution step. The increase in pressure in the column during the service cycles is not avoided by the conditioning prior to the commencement of the service cycles.

In the processes previously described for the adsorption of gallium from aluminate solutions the macroporous resins to be used as the carrier for Kelex 100 are characterised by their pore volume and their pore surface area. It has been found according to the invention that the selectivity and capacity of the resins are not determined by these parameters but by a specific pore structure. Pore volume and pore surface area give no information on pore structure. The pore structure of given monomer mixtures is determined by the porogen employed. According to the invention it has been found that the pore structure obtained when using methyl $C_2$–$C_6$-alkyl ketones, in the particular methyl isobutyl ketone, as the porogen in the polymerisation of divinylbenzene or mixtures of aromatic mono-, di- and/or trivinylbenzenes containing at least 50% by weight of divinylbenzene, is the determining factor for the high selectivity and capacity for the bound gallium ions.

The invention therefore relates to a process for recovering gallium from aqueous alkaline solutions by adsorption of the gallium on to bead-polymerised synthetic resins impregnated with Kelex 100 and elution thereof with aqueous acids, which is characterised in that macroporous polydivinylbenzene or macroporous divinylbenzene copolymers which have been obtained by the bead polymerisation of divinylbenzene or mixtures of aromatic mono-, di- and/or trivinylbenzenes containing at least 50% by weight of divinylbenzene, in the presence of methyl $C_2$–$C_6$-alkyl ketones, in particular methyl isobutyl ketone, are used as the synthetic resins, these special bead polymers are impregnated with 160 to 190 g, preferably 160 to 180 g of Kelex 100 per liter of (dry) resin and, after the gallium has been eluted with aqueous acids, the acid is first expelled from the resin bed by washing with water, after which the resin is washed with an aqueous sodium hydroxide solution and only then is the next service cycle begun with the loading step.

The methyl $C_2$–$C_6$-alkyl ketones which may be mentioned in particular are methyl ethyl ketone, methyl isopropyl ketone, methyl tert.-butyl ketone and methyl isopentyl ketone; methyl isobutyl ketone is preferably used.

The bead polymerisation of divinylbenzene or of the mixtures of aromatic mono-, di- and/or trivinylbenzenes containing at least 50% by weight of divinylbenzene, based on the total weight of the polymerisable monomers, in the presence of the methyl $C_2$–$C_6$-alkyl ketones, is carried out in the manner known per se for the production of macroporous bead polymers. Divinylbenzene or mixtures of aromatic mono-, di- and/or trivinylbenzenes containing at least 50% by weight of divinylbenzene are suspended with stirring with the required methyl $C_2$–$C_6$-alkyl ketone, preferably methyl isobutyl ketone, and conventional radical-forming agents, such as benzoyl peroxide or azoisobutyrodinitrile, in an aqueous solution containing 0.1 to 0.3% by weight of stabilisers such as for example ethyl cellulose, tylose etc. The suspension is heated with stirring to temperatures of 60° to 100° C. and stirred at this temperature until the polymerisation reaction has ended. After cooling to room temperature the bead polymer is separated off mechanically and freed from the entrapped methyl $C_2$–$C_6$-alkyl ketone by elution with alcohols, preferably methanol.

The methyl $C_2$–$C_6$-alkyl ketones are preferably used in a quantity of 100 to 300% by weight, based on the total weight of the monomers to be polymerised. Suitable mixtures of aromatic mono-, di- and/or trivinylbenzenes containing at least 50% by weight of divinylbenzene, based on the total weight of the polymerisable monomers, are particularly those mixtures available as technical-grade divinylbenzene. Such commercially available technical-grade divinyl benzenes contain ethylstyrenes and trivinylbenzenes in addition to the divinylbenzene isomers. The content of the technical-grade divinylbenzenes is 50 to 100% by weight, preferably 60 to 80% by weight of divinylbenzenes, based on the total weight of the monomers. The remaining percentage up to 100% by weight, namely 50 to 0% by weight, preferably 40 to 20% by weight, consists of ethyl styrenes and/or trivinylbenzenes.

Some typical compositions of technical-grade divinylbenzenes are for example as follows: (The description of the composition only refers to polymerisable compounds; non-polymerisable compounds, the total quantity of which in technical-grade divinylbenzene is up to about 2% by weight, are not mentioned.)
(a)
  64% by weight of divinylbenzenes
  36% by weight of ethyl styrenes
(b)
  80.1% by weight of divinylbenzenes
  19.9% by weight of ethyl styrenes
(c)
  58% by weight of ethyl divinylbenzenes
  18% by weight of diethyl styrenes
  24% by weight of trivinylbenzenes.

For the adsorption of gallium from aqueous alkaline solutions the macroporous polydivinylbenzene resins to be used according to the invention as the carrier for Kelex 100 are impregnated with such a quantity of Kelex 100—by treating them with solutions of Kelex 100 in alcohols, such as ethanol, for example by stirring for 30 to 60 minutes—that the resins are loaded with 160 to 190 g, preferably 160 to 180 g of Kelex 100 per liter of (dry) resin.

After adsorption the gallium is eluted virtually quantitatively by treating the loaded resins with aqueous acids. The gallium-containing acid eluates of the preceding service cycle can also be used as the aqueous acids. The use of the acid eluates as eluting agents has the advantage that eluates with higher gallium concentrations are obtained.

The process according to the invention can in principle be carried out as follows:

The resin impregnated with Kelex 100 which is to be employed according to the invention, is introduced into a column; a gallium-containing aluminate solution is passed through the resin bed (in a downward direction of flow) until the capacity of the resin is exhausted, i.e. until the gallium concentration in the aluminate solution issuing from the filter has risen to the value selected as the break point.

In the production of aluminium oxide by the Bayer process the gallium-containing aluminate solutions obtained have a temperature of 50°–80° C. It is advantageous to pass them through the resin bed immediately, i.e. without prior cooling.

After the loading step the resin bed is washed countercurrently with water until the pH value of the outflowing washing water has decreased from initially >13 to 11–9. Then the gallium is eluted by treating the loaded, washed resin with an aqueous mineral acid of 15–30% strength by weight, preferably aqueous sulphuric acid.

Then the resin bed is washed with such a quantity of water that the pH value of the outflowing washing water rises from an initial <1 to about 2. Then the resin bed is purified by treating it with an aqueous sodium hydroxide solution with a strength by weight of 0.1–5%, preferably 0.2–2%; in general 0.5 to 20, preferably 0.5 to 10, bed volumes of sodium hydroxide solution are required for this purification.

The linear flow rate of the aqueous solutions through the column is not a value of critical significance, although it does have an influence on the degree of utilisation of the solutions and the pressure drop. The finer the resin particle size the higher will be the pressure drop at given column dimensions.

EXAMPLE 1

(a) 360 g (=1.552 l) of one of the carrier resins produced as described below under (cα) and (cβ) are introduced into a solution of 257 g of Kelex ® 100 [active compound: 4-(ethyl-1-methyloctyl)-8-hydroxyquinoline] in 820 g of ethanol and stirred in this solution for 30 minutes at room temperature. Then the ethanol is distilled off with stirring in vacuo. The alcohol-moist resin loaded with Kelex 100 is finally dried in vacuo at 70° C., 1.55 l of a resin impregnated with 257 g of Kelex 100 are obtained.

(b) 199 g of this impregnated resin are introduced into a filter tube (internal diameter: 70 mm; height of resin bed: about 13 cm). An alkaline, gallium-containing aluminate solution from the production of aluminium oxide by the Bayer process is passed downwards through the resin bed at a linear flow rate of 21 m/h.

Temperature of the aluminate solution: 60° C.;

Composition of the aluminate solution:
140 g of $Na_2O/l$
80 g of $Al_2O_3/l$
30 g of organically bound carbon/l
150 mg of gallium/l.

When 20 bed volumes of aluminate solution have been passed through the resin bed the capacity of the resin for gallium is exhausted (gallium adsorption up to the selected break point: 2.5 g/l of resin). The resin is washed countercurrently with water until the pH value of the outflowing washing water has fallen to 10.5 (required quantity of water: ~25 BV). 1.5 l of 4N aqueous $H_2SO_4$ are passed through the filter for the elution of the gallium (specific load: 5 BV/h; direction of flow: downward). In order to expel the acid from the resin bed, the latter is washed with 1 BV of water (pH-value of the finally outflowing water: ~2); the resin bed is then purified by passing through 1 BV of NaOH of 0.5% strength by weight. When purification is complete the next loading step begins.

(c) The resin used as the carrier for Kelex ® 100 had been obtained as follows:

(α) A mixture of 600 g of technical-grade divinylbenzene (composition: 64% by weight of divinylbenzene; 36% by weight of ethyl styrenes), 900 g of methyl isobutyl ketone and 6 g of benzoyl peroxide is dispersed with stirring in an aqueous solution of 6 g of tylose in 3,000 g of demineralised water; after stirring for 1 hour at room temperature the polymerisation mixture is heated to 70° C. with stirring and stirred for 15 hours at this temperature. After a 2-hour curing phase at 90° C. the bead polymer obtained is filtered off with suction and washed with demineralised water. The entrapped methyl isobutyl ketone is removed by eluting the bead polymer with methanol in a column. Finally, the bead polymer is dried in vacuo at 40° C. 540 g of a polymer are obtained.

(β) A mixture of 600 g of technical-grade divinylbenzene (composition: 80.1% by weight of divinylbenzenes; 19.9% by weight of ethyl styrenes), 1,800 g of methyl isobutyl ketone and 6 g of benzoyl peroxide is dispersed with stirring in a solution of 9 g of ethyl cellulose in 4,500 g of demineralised water. The polymerisation mixture was processed further as described above under (c). 530 g of resin were obtained.

What is claimed is:

1. In a process for recovering gallium from an aqueous alkaline solution by adsorption of the gallium onto a bead-polymerized synthetic resin impregnated with 7-(4-ethyl-1-methyloctyl)-8-hydroxyquinoline and elution thereof with an aqueous solution of a mineral acid, the improvement which comprises (a) using as the synthetic resin a macroporous polydivinylbenzene polymer or a macroporous divinylbenzene copolymer, which polymer or copolymer has been obtained by bead polymerization of divinylbenzene or respectively of a mixture comprising two or three vinylbenzenes selected from the group consisting of aromatic mono-, di- and trivinylbenzene, containing at least 50% by weight of divinylbenzene, in the presence of a methyl $C_2-C_6$-alkyl ketone, (b) loading the polymer or copolymer with 160–190 g of 7-(4-ethyl-1-methyloctyl)-8-hydroxyquinoline per liter of (dry) resin; and (c), after the gallium has been eluted and the acid has been expelled from the resin bed by washing with water, washing the resin with an aqueous sodium hydroxide solution and only then beginning the next service cycle with the loading step.

2. The process of claim 1, wherein the macroporous polymer is impregnated with 160–180 g of 7-(4-ethyl-1-methoctyl)-8-hydroxyquinoline 100 per liter of (dry) resin.

3. The process of claim 1 wherein after the gallium has been eluted the resin bed is washed with such a quantity of water that the pH value in the outflowing washing water rises to about 2 and the resin bed is purified by treating it with 0.5–20 bed volumes of aqueous sodium hydroxide solution of a strength by weight of 0.1 to 5%.

4. The process of claim 1, wherein the synthetic resin is a macroporous polydivinylbenzene or macroporous divinylbenzene copolymer which has been obtained by bead polymerization of divinylbenzene or a mixture comprising two or three vinylbenzenes, said vinylbenzene selected from the group consisting of aromatic mono-, di- and trivinylbenzene, containing at least 50% by weight of divinylbenzene, in the presence of methyl isobutyl ketone.

5. The process of claim 1, wherein the synthetic resin is a macroporous divinylbenzene copolymer which has been obtained by bead polymerization of a mixture comprising two or three vinylbenzene, said vinylbenzed selected from the group consisting of aromatic mono-, di- and trivinylbenzenes, containing 60 to 80% by weight of divinylbenzene, in the presence of methyl isobutyl ketone.

6. A process according to claim 1, wherein the aqueous alkaline solution is an aluminate solution with a relatively high content of organic compounds obtained in the production of aluminum oxide.

7. A process according to claim 1, wherein the $C_2-C_6$-alkyl ketone is in an amount of 100 to 300% by weight based on the total weight of the monomers to be polymerized.

* * * * *